United States Patent [19]
Barnett

[11] 3,857,666
[45] Dec. 31, 1974

[54] APPARATUS FOR BELLING ENDS OF CONDUIT OR THE LIKE

[76] Inventor: Louis H. Barnett, 3631 Encanto Dr., Fort Worth, Tex.

[22] Filed: Apr. 9, 1973

[21] Appl. No.: 349,293

[52] U.S. Cl. .................................... 425/393, 72/85
[51] Int. Cl. ........................................... B29c 17/00
[58] Field of Search ................ 425/392, 393; 72/85

[56] References Cited
UNITED STATES PATENTS

| | | | |
|---|---|---|---|
| 729,099 | 5/1903 | Smith | 72/85 |
| 3,205,535 | 9/1965 | Niessner et al. | 425/393 X |
| 3,484,900 | 12/1969 | Sands et al. | 425/393 |
| 3,672,804 | 6/1972 | Dalik | 425/393 X |
| 3,728,059 | 4/1973 | de Putter | 425/393 X |

*Primary Examiner*—Robert L. Spicer, Jr.
*Attorney, Agent, or Firm*—Wofford, Felsman, Fails & Zobal

[57] ABSTRACT

An improvement in apparatus for automatically belling a first end of plastic conduit, such as elbows or the like, for conformingly receiving a second end of conduit therewithin characterized by an expandable insertable mandrel connected with conventional equipment for insertion within and withdrawal from the ends of the conduit. The expandable mandrel includes a plurality of at least three pieces having a predetermined peripheral radius of curvature that is the same as the second end of the conduit for forming the belled ends when they are moved radially outwardly. The pieces contract radially inwardly to free the belled ends of the conduit. In a specific embodiment, an annular groove is provided for receiving a seal means inside the belled end. Also disclosed are specific structure for effecting the radial inward and outward movement and smoothing the final belled end and its groove for the seal; including mounting structure, swage for forcing the pieces radially outwardly and structure for forcing relative movement between the swage and the pieces of the mandrel and retracting the pieces inwardly when the swage is pulled from within them. A two-piece receiving mold is provided for forming a more nearly perfect belled end.

8 Claims, 14 Drawing Figures

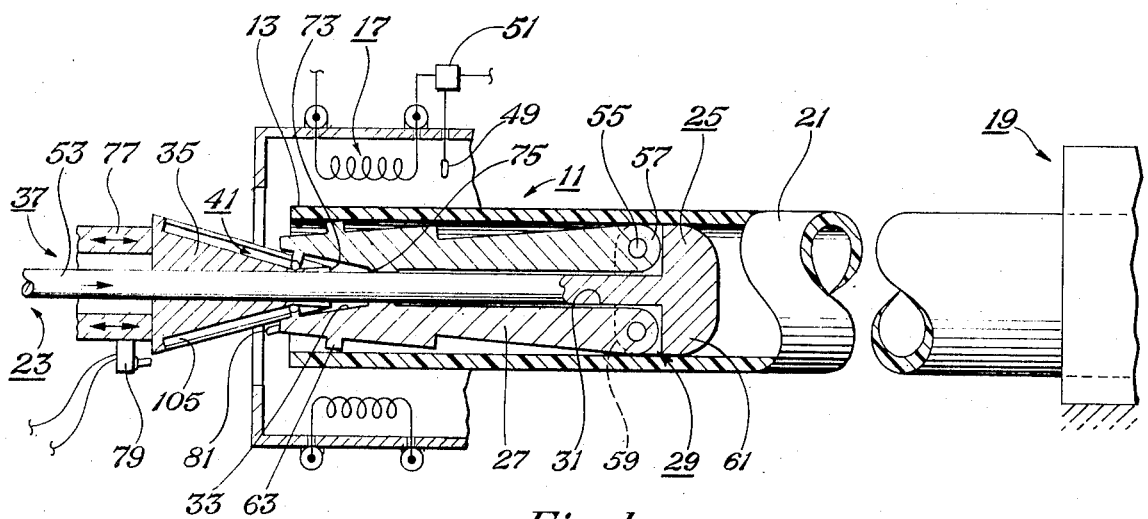
Fig.1
Fig.4
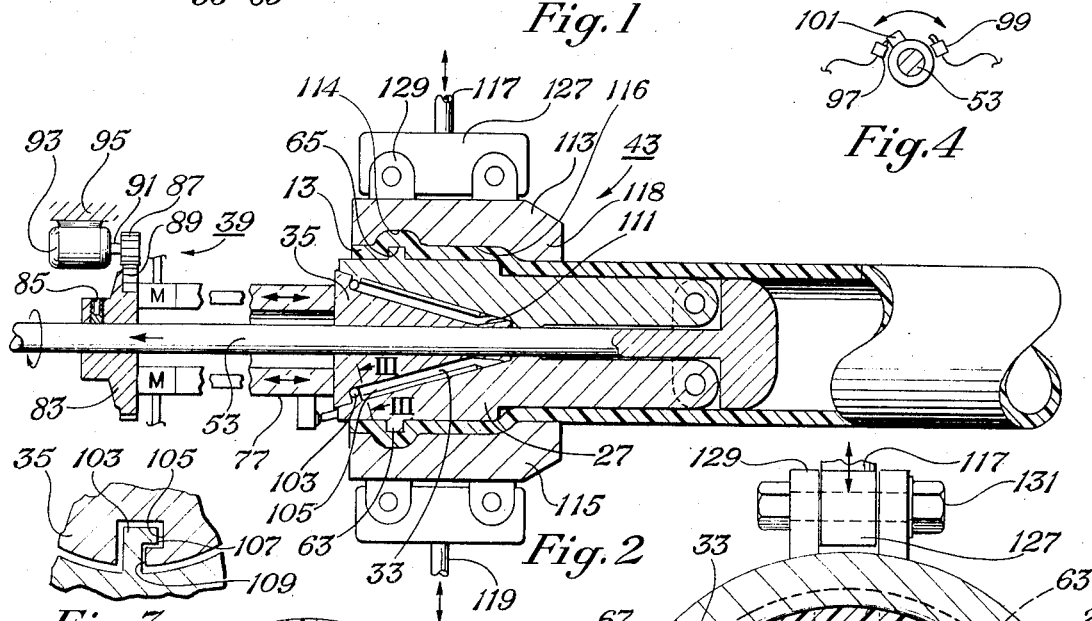
Fig.2
Fig.3
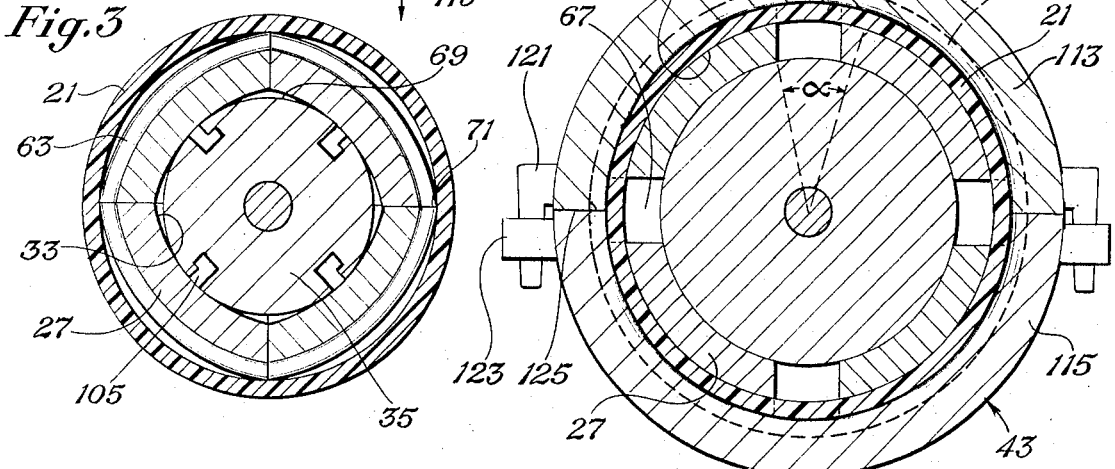
Fig.5
Fig.6

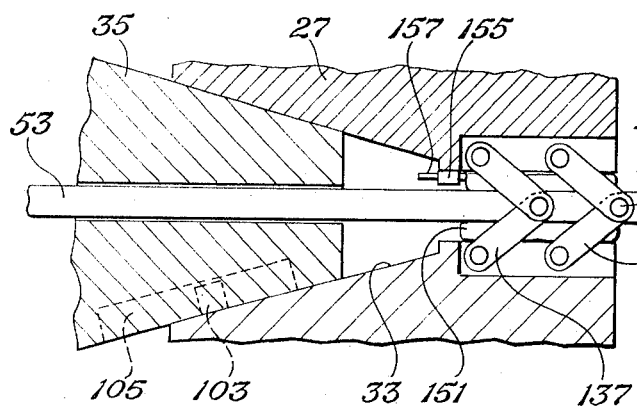
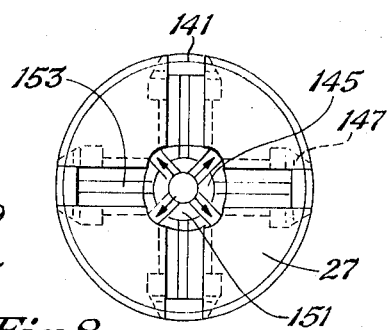
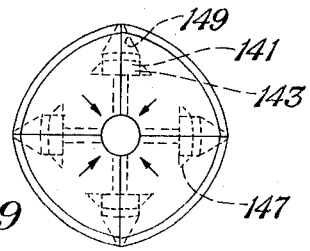
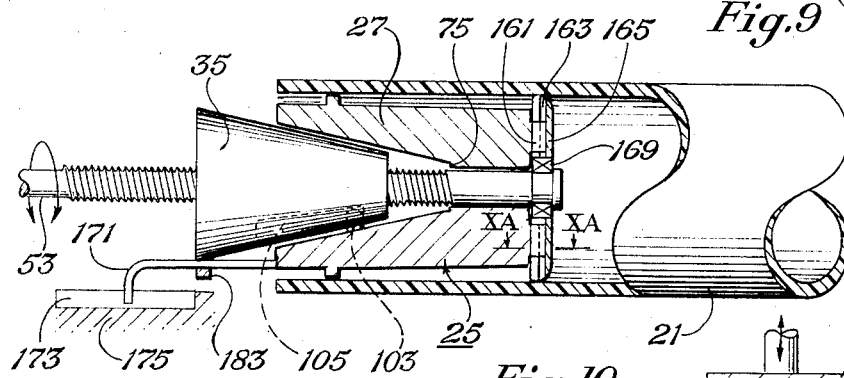
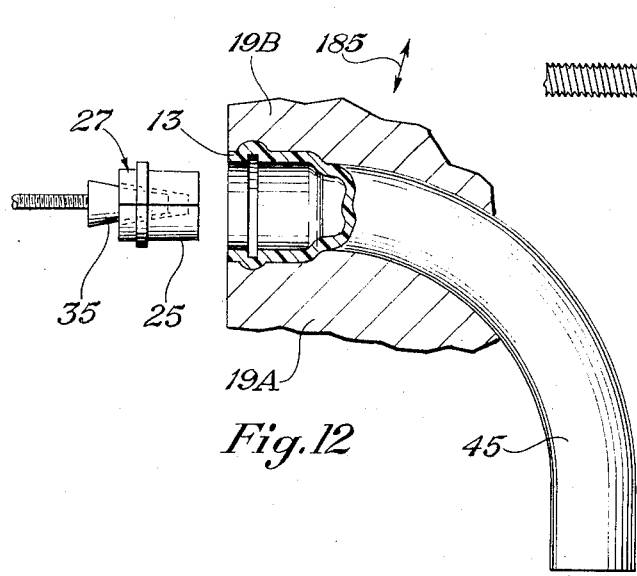
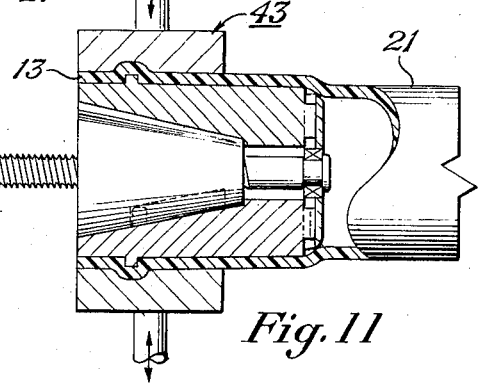
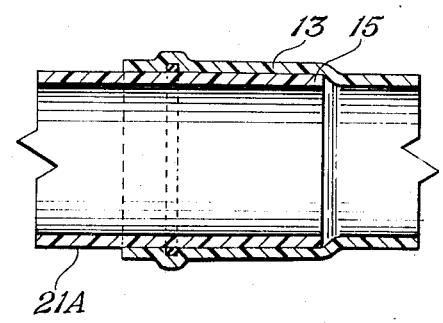

APPARATUS FOR BELLING ENDS OF CONDUIT OR THE LIKE

BACKGROUND OF THE INVENTION

1. Field of the Invention

This invention relates to method and apparatus for automatically belling a first end of a thermoplastic conduit for conformingly receiving a second end therewithin. More particularly, this invention relates to an improvement in the conventional apparatus for automatically belling the first end of a thermoplastic conduit for conformingly receiving the second end therewithin.

2. Description of the Prior Art

In my copending application Ser. No. 127,931, entitled "Precision Bending of Plastic Pipe," I described the difficulties of the prior art. That application delineated and claimed a much improved method for bending plastic pipe, forming the elbows and the like. Recently there has been developed a machine in Great Britain that will automatically bend and bell the ends of elbows or the like. That apparatus includes a heating means for at least locally heating the end of the conduit to be belled, a support means for supporting the conduit and an insert means for inserting an insertable mandrel into the end of the conduit for expanding the end to thereby bell it to the predetermined set of internal dimensions for receiving therewithin a second end of conduit. To date, however, this machine, or apparatus, has been limited to conduit diameters in the range of 16 to 60 millimeters in diameter and has simply jammed a slick mandrel directly into the heated end of the conduit to form the belled end. Those skilled in this art will appreciate that ramming a mandrel into softened thermoplastic conduit presents a problem in the larger diameter sizes and is completely inoperable when a groove is desired to be formed in the belled end to receive a seal means, such as an O-ring, for sealing engagement with the second end inserted therewithin.

Consequently, it is an object of this invention to provide an improved apparatus for at least semi-automatically belling the ends of a conduit, such as elbows or the like, and obviating the disadvantages of the prior art apparatus.

It is also an object of this invention to provide apparatus for at least semi-automatically belling the ends of a thermoplastic conduit of large size and forming a groove for receiving a seal means therewithin, and obviating the disadvantages of the prior art apparatus.

These and other objects will become apparent from the descriptive matter hereinafter, particularly when taken in conjunction with the drawings.

BRIEF DESCRIPTION OF THE DRAWINGS

FIG. 1 is a partial side elevational view, partly in section and partly schematic, of one embodiment of this invention.

FIG. 2 is a partial side elevational view, partly in section and partly schematic, of an embodiment of this invention that is the same as or similar to FIG. 1; illustrating the apparatus at a later stage of operation.

FIG. 3 is a partial cross sectional view taken along the lines III—III of FIG. 2.

FIG. 4 is a partial schematic end view showing limit switches for limiting the angle of rotation of the shaft and swage of the embodiment of FIG. 2.

FIG. 5 is a partial cross sectional view of the embodiments of FIGS. 1 and 2 with the swage partially inserted within the collapsible mandrel.

FIG. 6 is a partial cross sectional view of the embodiments of FIGS. 1 and 2 with the mandrel fully inserted.

FIG. 7 is a partial side elevational view, partly in section, illustrating another embodiment of this invention.

FIG. 8 is an end view of an expansible mandrel in accordance with this invention in its fully expanded position.

FIG. 9 is an end view of the expansible mandrel of FIG. 8 in its retracted position.

FIG. 10 is a partial side elevational view, partly in section and partly schematic, showing still another embodiment of this invention.

FIG. 10A is a partial cross sectional view taken along the line XA of FIG. 10.

FIG. 11 is a partial side elevational view, partly in section and partly schematic, of the embodiment of FIG. 10; showing the expansible mandrel fully expanded within a receiving mold emplaced about the belled end.

FIG. 12 is a plan view of still another embodiment of this invention for belling ends of elbows or the like.

FIG. 13 is a partial side sectional view showing the first and second ends of conduit conformingly fitted together with a seal means emplaced within the groove in the belled end.

DESCRIPTION OF PREFERRED EMBODIMENTS

Referring to FIG. 1, there is illustrated apparatus 11 for automatically belling a first end 13 of thermoplastic conduit for conformingly receiving therewithin a second end 15, FIG. 13. As illustrated, the second end 15 has external dimensions that conformingly mate with the internal dimensions of the belled first end 13. As is conventional in this art, the apparatus 11 includes a heating means 17 for at least locally heating the first end 13 of the conduit 21; a support means 19 for supporting the conduit 21 and an insert means 23 for inserting an insertable mandrel 25. The mandrel 25 is provided for expanding the first end 13 to thereby bell the end to have a predetermined set of internal dimensions for receiving a second end 15.

This invention comprises an improvement in the apparatus 11 wherein the mandrel 25 is expansible, or expandable. The expandible mandrel 25 comprises a plurality of at least three pieces 27; and a mounting means 29 holding the plurality of pieces 27 assembled and adapted for allowing radially outward expansion of the pieces 27. The mandrel 25 includes a central bore 31 having a first conically shaped bore 33 at the end opposite the mounting means 29. The conically shaped bore 33 is provided for receiving a swage means, such as swage 35. The swage 35 is provided for expanding the plurality of pieces 27 radially outwardly to form the belled ends. As illustrated, the swage 35 is adapted to conformingly fit the first conically shaped bore 33 when fully seated thereinto for forming the belled end 13. Suitable forcing means 37 is provided for forcing the relative movement between the swage 35 and the pieces 27. A smoothing means 39, FIG. 2, is provided for smoothing out the interior surface of the final belled end and removing irregularities caused by normal discontinuities of the expansibly mounted pieces 27. A retraction means 41 is provided for effecting retraction of the plurality of pieces radially inwardly as the swage 35 is withdrawn from its fully seated position.

Preferably, a receiving mold 43, FIG. 2, is provided for defining the external shape of an ensuring the obtainment of the proper internal dimensions of the belled end 13 for fit with a second end 15.

AMPLIFIED DESCRIPTION

The first and second ends 13 and 15 of the conduit 21 are normally planar ends that are sawed off as the plastic conduit is extruded. The conduit 21 is formed of any thermoplastic material which may be softened by heat then hardened by cooling. Thermoplastic material is, of course, sufficiently rigid to serve in the application of, or use as, a pipe or conduit. The material may be, for example, polyvinylchloride (PVC); polystyrene; acrylonitrile butadiene styrene copolymer (ABS); the polyolefinics, such as polyethylene or polypropylene; or other homopolymers and copolymers identified as thermoplastic in nature. Moreover, the ends may be formed on linear conduit or they may be formed on short sections of linear conduit that are to be formed into elbows 45, FIG. 12, or any other suitable combination. In my above-referenced application Ser. No. 127,931, I described improved method and apparatus for precision bending of such plastic pipe to form elbows or the like. The apparatus of this invention is readily incorporated into the automated apparatus of that invention and reference is made to that invention for a detailed description of the apparatus described and claimed therein.

The heating means 17 may comprise any of the means conventionally employed in this art. For example, some of the machines of the prior art have employed conduction from a heated mold or the like to heat the first end 13 of the conduit. I have found it advantageous to employ forms of heating that use radiation and convection forms of heating also. For example, infra-red lamps or the illustrated electrical elements are readily controlled by use of conventional temperature sensor 49 and thermostat, or control, 51. On the other hand, the heating means 17 may comprise contact, externally or internally, with heated fluid; such as, hot oil, molten salts, or chemicals that have a boiling point above the softening temperature of the plastic. Any other suitable heating means may be employed.

The support means 19 may comprise a tubular support such as illustrated in FIG. 1 in which the conduit 21 is moved longitudinally. On the other hand, it may comprise suitable molds 19A and 19B, FIG. 12. Such molds are described in my abovementioned application Ser. No. 127,931.

The insert means 23 is provided for inserting the expansible mandrel 25 into the end 13 prior to belling of the end and for withdrawing the collapsed mandrel 25 from the belled end. The insert means of the prior art may be satisfactorily employed herein. These insert means have ordinarily employed mechanical means such as a rotating nut driving a screw thread on the illustrated shaft 53, the nut and screw not being shown. Of course any of the means ordinarily employed for insertion and withdrawal of mandrels or the like may be employed herein, as long as they are subject to the limitations of being operable at precise times. For example, hydraulic cylinders, or racks and pinions may be employed for effecting the insertion and retraction of the mandrel 25.

The foregoing elements such as the respective ends 13 and 15 of the conduit 21, the heating means, the support means 19 and the insert means 23 are conventional and are not being claimed per se herein. Accordingly, it is believed unnecessary to burden the reader and further encumber this already lengthy specification.

As indicated hereinbefore, the expandable mandrel 25 includes a plurality of at least three pieces 27. As illustrated, and shown clearly in FIGS. 5 and 6, there are four pieces 27. The respective pieces 27 have a predetermined peripheral radius of curvature that is the same as the second end 15 of conduit 21 so that when expanded outwardly, the interior of the belled first end 13 will have an interior shape that conformingly fits with the exterior of the second end 15. Each of the pieces 27 is pivotally mounted about a fulcrum shaft 55, FIG. 1. Specifically, each piece 27 has a bifurcated end 57 having an aperture through which the fulcrum shaft 55 penetrates. The fulcrum shaft 55 may comprise a simple bradded shaft, a bolt and nut, or as desired to facilitate assembly. The fulcrum shaft 55 is journalled in a bracket 59 that is an extension of a base 61. As can be seen in FIG. 1, the respective pieces 27 pivot inwardly to a retracted, or collapsed, configuration for insertion within the conduit 21. The pieces have their pivotal mounting affixed with respect to their exterior such that when fully extended, as illustrated in FIG. 2, they form accurately the desired internal dimensions of the belled end 13. Expressed otherwise, the pieces form a cylindrical interior in the belled end 13.

As illustrated, the pieces 27 have an annular ridge 63 disposed peripherally thereof for forming a groove 65, FIG. 2, for receiving a seal means. As illustrated, the annular ridge 63 has a cross sectional shape having right angles at its peripherally outermost portions. The first conically shaped bore 33, FIGS. 1 and 6, is truly frusto-conical in shape when the pieces 27 are in their fully extended position, as illustrated in FIG. 6. When the pieces 27 are retracted, as illustrated in FIG. 5, however, the bore 33 does not conformingly fit the truly conically shaped exterior 69 of the swage 35. Nevertheless, the pieces 27 are economically formed from cylindrical stock simply by milling off the excess portion to allow the inward retraction of the pieces 27. The blank left by the excess portion is shown as a discontinuity 67, FIG. 6, formed by expansion of the pieces 27 outwardly into their fully expanded position.

As the pieces 27 are initially expanded outwardly, there is a tendency for the respective edge portions 71 to expand the wall of the conduit 21 outwardly at this portion first to help in avoiding inwardly sagging walls at the discontinuities 67. To provide a smooth and continuous interior finish to the belled end 13, however, I have found it advisable to rotate the mandrel 25 through an angle $\alpha$, FIG. 6. The angle $\alpha$ is slightly less than about 30 degrees (°). For example, I have found it necessary to rotate the expansible mandrel 25 through only about 26° to afford a smooth continuous interior surface on the belled end 13. If desired, the respective edge portion 71 may be slightly chamfered, or rounded, to assist in the rotation. In addition to or instead of the chamfering, the swage 35 may be withdrawn slightly to allow slight radially inward movement of the pieces 27 to assist in rotation through the angle $\alpha$; and, then, again pushed in to expand the expansible mandrel 25 into its fully expanded position. Rotation may be effected manually, automatically, or semi-automatically as described in the operational description with regard to FIG. 2 hereinafter.

The swage 35 is slidable longitudinally of shaft 53 in FIGS. 1 and 2. The swage 35 is forced inwardly by tubular shaft 77 for expanding the pieces 27. The swage 35 has, at its interior end, a shoulder 73 that seats upon a slight seat 75 to prevent running the swage 35 too far inwardly and over expanding the pieces 27. The tubular shaft 77 serves to withdraw the swage 35 for an indicated distance. For example, the swage 35 is withdrawn only a small distance prior to the rotating of the pieces 27 through the angle $\alpha$, but is withdrawn substantially completely for moving the pieces 27 into their fully retracted position. The shaft 77 may be powered in its respective directions by and of the conventional means; such as, the mechanical or hydraulic means described hereinbefore for moving the shaft 53. I have found it advantageous to employ motor means M, FIG. 2, for effecting the respective directions of movement. The motor means M may comprise hydraulic cylinders to which hydraulic fluid is directed in response to conventional electrohydraulic valves. The conventional electrohydraulic valves are operated responsive to limit switch 79 and stop 81. Specifically, the limit switch 79 comprises a two position switch with back side contacts. Such a switch is conventional and need not be described in detail herein. For example, when the swage 35 is fully inserted, the actuator of limit switch 79 is depressed to shut off the hydraulic valve to stop inward movement of the respective hydraulic cylinder serving as the motor M pushing the tubular shaft 77 inwardly, as illustrated in FIG. 2. Conversely, partial withdrawal of the swage 35 will allow extension of the plunger on the limit switch 79 closing backside contacts and stopping withdrawal, as for rotation of the expanded pieces through the angle $\alpha$ for smoothing the interior of the belled end 13. The limit switch 79 is again closed when the pieces have been rotated through the angle $\alpha$ and it is desired to expand them by full insertion of the swage 35. A manual override switch is employed to effect full retraction of the swage 35. If desired, a multivibrator or similar counter can be employed to allow semi-automatic full retraction after the closure of the limit switch 79 for the second time. It is believed unnecessary to describe in detail the hydraulic rams employed as the motors M or the details of flow of fluid to the respective piston and cylinder ends of the hydraulic ram to effect the inward and outward movement of the tubular shaft 77, since such is conventional. It is sufficient to note that the motors M are firmly anchored against shaft collar 83, FIG. 2, for effecting the relative motion between the swage 35 and the pieces 27. The collar 83 is firmly affixed to the shaft 53, as by set screw 85.

The expansible mandrel 25 is rotated manually through the angle $\alpha$ for effecting the desired smooth interior finish in the belled end. If desired, the expansible mandrel 25 may be rotated automatically or semi-automatically as illustrated in FIG. 2. Therein, the pieces 27 are rotated through the angle 60 by way of driving gear 87 engaging driven gear 89. The driving gear 87 is mounted on shaft 91 of motor 93 that is fixed to a suitable support 95. The gears 87 and 89 have respective bevelled sides to effect engagement as shaft 53 moves the shaft collar 85. If desired, the support 95 can be moved with the shaft 53 and retain engagement of gears 87 and 89. As illustrated in FIG. 4, the shaft 53 is rotated through the angle $\alpha$ between respective limit switches 97 and 99 that are suitably closed by protrusion 101. Thus, it can be seen that the exterior surface of the respective pieces 27 in their fully expanded position will overlap between their respective first and second rotary positions to form a smooth interior of the belled end 13 removing any tendency to form irregularities caused by the normal discontinuities 67 of the expansibly mounted pieces 27.

It is desirable that the pieces 27 be retracted radially inwardly before they are moved longitudinally of the conduit 21 in order to prevent a "smearing effect;" in which the clear, smooth interior surface of the belled end 13 would otherwise be distorted. The illustrated retraction means 41 for effecting this radially inward retraction of the pieces 27 comprises radially extending protrusion 103, FIGS. 1–3, that engages a similarly shaped groove 105 in the swage 35. As illustrated more clearly in the cross sectional view of FIG. 3, the radially inwardly extending protrusion 103 is L-shaped in cross section such that its shoulder 107 engages the second shoulder 109 defining the L-shaped groove 105. Consequently, the protrusion 103 is constrained to move radially inwardly as the swage 35 is withdrawn outwardly. Inward movement of the protrusion 103 pulls the free end of its piece 27 radially inwardly, as illustrated in FIG. 1. Expressed otherwise, a retraction of the swage 35 causes a partial inward movement of the respective pieces 27 because of the co-engaging shoulders 107 and 109 of the respective protrusion 103 and groove 105. As can be seen in FIG. 2, the protrusion 103 contacts the outer end of the groove 105 also to limit inward movement of the swage 35. The groove 105 has an entry 111 adjacent the interior end of the swage 35 in order to allow insertion of the protrusion 103 into the groove 105.

As illustrated in FIGS. 2 and 6, and as indicated hereinbefore, a receiving mold 43 is employed for effecting a more nearly perfect belled end 13. The receiving mold 43 comprises a pair of tubular shells 113 and 115 and a means, such as reciprocally movable shafts 117 and 119, for moving the pair of tubular shells 113 and 115 laterally together for receiving an end 13 to be belled and for moving them apart to free the final belled end 13. The respective shafts 117 and 119 are connected with their respective tubular shells 113 and 115 by way of respective members 127 and mounting brackets 129. The member 127 is connected with the respective mounting brackets 129 by suitable means, such as nuts and bolts 131.

The tubular shells 113 and 115 conformably fit together laterally to define an internal cavity of the desired shape and dimensions. As illustrated, the shells 113 and 115 have an internal annular groove 114 about a main bore 116 defining the outer dimensions of the belled end 13. Preferably, the tubular shells 113 and 115 also have an interiorly extending portion 118 defining the shape of the joinder of the belled end 13 with the remainder of the conduit 21, as illustrated in FIG. 2. The annular groove 114 affords a recess into which the plastic of the walls of the end 13 of the conduit 21 can be expanded outwardly by the ridge 63 of the expandable mandrel. A male guide 121 at respective points on the tubular shell 113 co-engages a receptacle 132 to effect proper alignment. If desired, the respective edges 125 may be of tongue and groove construction or the like also to ensure a proper fit. This has not proven to be necessary when the respective guides and receptacles are employed. It is apparent that the tubular shells need only be moved apart a sufficient distance to allow the ridge formed around the interior groove 65 to be withdrawn longitudinally.

The tubular shells 113 and 115 may be moved into place about the first end 13 of the conduit 21. On the other hand, the tubular shells 113 and 115 may be permanently emplaced at a given location, and the conduit 21 may be emplaced within the tubular shells.

In operation, the first end 13 of the conduit 21 is emplaced within the heating means 17 where 14 is heated to its softening temperature. Thereafter, the heated and softened first end 13 is emplaced inside the receiving mold 43; and the expansible mandrel 25 inserted therewithin, as indicated hereinbefore. The motors M are then operated, either automatically or by manual actuation of their switches to drive the swage 35 inwardly, expanding the pieces 27 outwardly into their fully expanded position, similarly as illustrated in FIG. 6. With the first expansion, there are points of discontinuities 67 that would have rough interior finishes if not smoothed. Consequently, the operator, or an automatic control, will effect retraction of the swage 35 slightly, drawing the respective pieces 27 inwardly slightly. The motor 93 is then energized to rotate the pieces 27 through the angle $\alpha$. The swage 35 is again driven inwardly to fully seat it and expand the pieces 27 to their fully expanded position. The final finish of the belled end 13 is smooth with a continuous groove 65 formed therein. After the final smooth finish is effected interiorly of the belled end 13, the swage 35 is withdrawn from the first conical shaped bore 33, FIG. 2. The shoulder 109 of the groove 105 effects retraction radially inwardly of the free end of the pieces 27, collapsing the expansible mandrel 25. The collapsed mandrel 25 is withdrawn from the first belled end 13. By this time sufficient heat will have been conducted away from the belled end 13 so that it is below its softening temperature and will retain the belled shape imparted to it. If desired, a cooling fluid may be employed with the mandrel 25 and the belled end 13, as described in more detail hereinafter. The tubular shells 113 and 115 are expanded outwardly to free the belled end 13 and allow it to be withdrawn longitudinally from within the receiving mold 43. Thereafter, the segment of conduit 21 with its first belled end 13 and its second end 15 may be moved to the next station and another such conduit 21 emplaced for belling of its first end 13.

Another embodiment of this invention is illustrated in FIGS. 7–9. Therein, the pieces 27 are expansible radially outwardly by the swage 35 moving relatively inwardly thereof in the outwardly expanding bore 33. In order to effect the same relative orientation of the respective pieces 27 parallel to the shaft 53, however, a parallelogram linkage 133 is employed for mounting of the pieces 27. As is known with parallelogram linkages, a plurality of respective links 135 and 137 are pivotally connected with the shaft 53 and with the respective pieces 27 by way of fulcrum shafts 139. Suitable fulcrum shafts have been described hereinbefore with respect to fulcrum shaft 55 of FIG. 1. The respective links and fulcrum shafts for the diametrically opposed pieces 27 may be connected at the same longitudinal location but will be offset slightly for the opposite set to prevent problems having sufficient room. Also in the embodiment of FIGS. 7–9, a plurality of respective plugging sectors 141 are provided for moving into the normal discontinuity 67, FIG. 6, to plug the respective gaps between the plurality of pieces 27 when the pieces are expanded radially outwardly into their fully expanded position, as illustrated in FIG. 8. As illustrated in FIG. 9, the respective plugging sectors 141 are retractable into recesses 143 before the pieces 27 are retracted radially inwardly to their retracted position. An expansion and retraction means 145 is provided for expanding and retracting the respective plugging sectors 141. The use of the respective plugging sectors 141 eliminates the necessity of having to rotate the expansible mandrel 25 through the angle $\alpha$ to form a smooth interior finish to the final belled end 13.

As can be seen from FIG. 8, each respective plugging sector 141 has lateral extension 147 on each side. The lateral extensions 147 serve as guides and also as limits to prevent outward extension of the respective plugging sectors 141 sufficiently to effect a rough finish on the interior of the belled end. Expressed otherwise, the respective lateral extensions 147 have a degree of angularity that conformingly fits with the passageways 149 of the respective recesses 143 to guide the plugging sectors 141 outwardly and to stop the radial outward expansion at the proper radial distance for effecting a satisfactorily smooth finish on the interior surface of the belled end 13.

The expansion and retraction means 145 comprises an expansible bag 151 connected with the plugging sectors 141 by way of shafts 153. The expansible bag 151 is connected with a conventional source of high pressure hydraulic fluid by way of suitable conventional electrohydraulic valves. The respective valves are operably connected with the limit switch 155, FIG. 7. The limit switch 155 has front and back side contacts such that inflation of the expansible bag 151 is effected when the limit switch 155 has its plunger 157 depressed by inward movement of the swage 35; and retraction of the bag 151 is effected by opening of the limit switch 155 when its plunger 157 is released. Expressed otherwise, the plugging sectors 141 are moved outwardly only after the respective pieces 27 have been expanded most of their radial outward expansion; and the plugging sectors 141 are retracted before the respective pieces 27 are retracted any significant degree.

The operation of the embodiment of FIGS. 7–9 is substantially the same as described hereinbefore with respect to the embodiment of FIGS. 1–6. The parallelogram linkage 133 does not alter the operation to any significant extent. The use of the expansion and retraction means 145 and the plugging sectors 141 eliminates the necessity for the step of rotating the expansible mandrel 25 through the angle $\alpha$. Otherwise, the expansible mandrel 25 has its pieces 27 retracted radially inwardly after their expansion to their fully extended position before the collapsed mandrel 25 is withdrawn from the first end 13 of the conduit 21.

As indicated hereinbefore, the first end 13 may be belled into a receiving mold 43 or not depending upon several factors; such as, the plastic being used, the temperature of the plastic and the like. Obviously, if the plastic is too molten, it will not retain its belled shape and the use of the receiving mold 43 will be required.

Still another embodiment of this invention is illustrated in FIGS. 10–11. In the embodiment of FIGS. 10–11, the expansible mandrel 25 comprises a plurality of pieces 27, and the swage 35 and operates in principle similarly as described hereinbefore. In the embodiment of FIGS. 10–11, however, the respective pieces 27 have riders 161 that are movable longitudinally of tracks 163 that extend radially of the base 165. As illustrated in FIG. 10A, the tracks 161 have a cross sectional shape that resembles an inverted T to extend into the T-shaped groove defining the track 163. Consequently, the rider 161 is able to slide longi- of the track. The rider 161 has appreciable length to prevent binding as the respective pieces are forced radially outwardly by the inwardly moving swage 35.

Also in the embodiment of FIGS. 10–11, the shaft 53 is rotatable with respect to the pieces 27 and the swage 35. The swage 35 is threadedly mounted on the shaft 53 so as to be moved inwardly and outwardly with respect to the pieces 27, depending upon the direction of rotation of the shaft 53. The shaft 53 is journalled in the base 165 by way of suitable bearing means 169. Rotation of the respective pieces 27 and the swage 35 is prevented by way of slidable anchor 171 engaging a slot 173 in suitable stationary support 175. The embodiment of FIGS. 10–11 also uses the same protrusion 103 and slot 105 to effect the radially inward retraction of the respective pieces 27 before the retracted expansible mandrel 25 is removed from the conduit 21. As illustrated in FIG. 11, a receiving mold 43 may be emplaced about the first end 13 for accurately defining the shape of the belled end 13, similarly as described with respect to FIGS. 1–6 hereinbefore. As illustrated in FIG. 11, however, the receiving mold 43 is abbreviated in its longitudinal extent, since the shape and finish of the upper portion of the belled end 13 is more critical than its juncture with the conduit 21.

As implied from the descriptive matter hereinbefore, the collapsible mandrel 25 is inserted into the conduit 21 and the anchor 171 engages the slot 173 at the same time. Thus, the anchor 171 prevents rotation of the collapsible mandrel 25 and the swage 35. Yet, the swage 35 is moved inwardly longitudinally of the threaded shaft 53 to expand the respective pieces 27 radially outwardly, sliding down the shaft of the anchor 171 by its keyway 183.

In the embodiment of FIGS. 10–11, the respective limit switches delineated hereinbefore may be employed. I have found it advantageous, however, to employ a current limited motor to simply drive the shaft 53 to seat the swage 35 on the seat 75 and to hold it there as long as desired. Such current limiting motors are conventionally available and need not be described in detail herein. It is sufficient to note that they do not overheat but obviate the necessity for relatively more elaborate controls. The operator is still able to reverse the motor to back off the swage slightly for rotation, if it is employed, to smooth the interior finish of the belled end. Also, the expandable plugging sectors 141 and the expansion and retraction means 145, delineated with respect to FIGS. 7–9, may be employed if desired. In fact, the use of an expansible bag becomes simpler when no parallel linkages 133 are employed.

Another embodiment of this invention is illustrated in FIG. 12. This embodiment is most readily incorporated into an automated apparatus such as described in my aforementioned application Ser. No. 127,931. Therein, the expansible mandrel 25 with its swage 35 is inserted into the first end 13 of an elbow 45 to at least semi-automatically form a belled end 13 therewithin. The belled end 13 can receive a second end 15 of another section of conduit 21A, as illustrated in FIG. 13. FIG. 12 is mainly schematic. The expansible mandrel 25 may be of either of the embodiments described hereinbefore and may employ any of the respective mounting means, forcing means, smoothing means, or retraction means described hereinbefore to form the belled end 13. As illustrated, the belled end 13 has been formed and the pieces 27 of the expansible mandrel 25 retracted and withdrawn therefrom. The outer portion 19B of the support means will then be drawn outwardly, as indicated by arrow 185. The elbow 45 may then be picked out of, or automatically ejected from, the interior portion 19A of the support means before loading another section of conduit. Each section of conduit may be a straight section to be formed into an elbow 45, or it may comprise a finished elbow 45 into which it is desired to form the belled end 13 separate and apart from the forming of the elbow.

From the foregoing description and drawings, it becomes apparent that a variety of different structures may be employed in the respective apparatus subassemblies. For example, the forcing means 37 may comprise the tubular shaft 77, with or without the motor M on collar 83 of shaft 53, FIG. 2; or it may comprise the respective rotating threaded shaft 53 with an interiorly threaded aperture in the swage 35, coupled with the anchor 171, FIG. 10.

Similarly, the smoothing means 39 may comprise means; such as, the motor 93 and gear 89, of FIG. 2; for rotating the expansible mandrel, with or without a slight retraction and a second expansion outwardly to smooth out the interior finish of the belled end 13; or it may comprise the plugging sectors 141 and the expansion and retraction means 145 of FIGS. 7–9. Also, the mounting means 29 may comprise, respectively, the pivotal fulcrum shaft 55, bracket 59 and the bifurcated end 57 for the pivotally mounted pieces 27 of FIGS. 1 and 2; the parallelogram linkage 133 of FIGS. 7–9; or the rider 161, track 163 and base 165 of FIGS. 10–11.

A cylindrical belled end 13 has been described hereinbefore for receiving the cylindrical second end 15, since sealing is more easily maintained during expansion and contraction. If desired, the second end 15 may be slightly frusto-conical with from 1°–3° of conical shape imparted thereto; and the belled end 13 have a conformingly inverted frusto-conical shape for conformingly receiving the conical shaped second end 15. Any other desired shape and conformingly receiving shape can be employed for, respectively, the second end 15 and the belled end 13.

While a ridge 63 and groove 65 having respective right angles of 90° have been described hereinbefore, the grooves 65 may have any desired cross sectional shape. Of course, the ridge 63 will have an exterior shape designed to effect the interior shape of the groove 65.

While a shoulder 73 and a slight seat 75 have been described hereinbefore to prevent over expanding of the pieces 27, a confining means may be employed to limit the outward movement of the respective pieces 27 to prevent over expansion. OVer expansion is ordinarily not a problem where the mounting means limits the degree of movement, but is required where the pieces 27 pivot freely without a limit means to limit the degree of pivoting. If desired, of course, the limit means may comprise respective co-engaging limits on the bifurcated end 57 and the bracket 59 of FIG. 1.

While a receiving mold 43 has been described hereinbefore for accurately defining the outside dimensions of the belled end 13, such receiving mold may not be necessary with better plastics such as the ABS copolymer, that are readily molded and that cool rapidly enough to retain the shape without assistance.

In operation, hereinbefore, the description assumed the presence of an operator to operate the respective switches with limit switches providing limits to the respective operations. If desired, of course, the entire operation may be automated such that the operator need only start the sequence of operations and a series of limit switches in conjunction with counters, timers and the like, employed in the manner of conventional control equipment to automate the entire operation once started. I have found it advantageous to initially with an operator controlled operation and gradually automate the respective steps. Of course, as indicated hereinbefore, even less automation can be employed with the operator carrying out almost all of the operational steps manually.

While the use of plugging sectors has been described hereinbefore, I have found it preferable to employ rotation of the expansible mandrel 25 through the angle α in order to simplify construction of the expansible mandrel.

In the embodiment of FIGS. 7–9, the use of the expansible bag 151 has been described in the expansion and retraction means 145. Obviously, instead of the expansible bag 151, suitable eccentrically mounted linkages may be employed for effecting expansion of the plugging sectors 141 radially outwardly upon rotation of a master cam or the like to which the shafts 153 are connected. Any other suitable expansion and retraction means may be employed for the expansion and retraction means 145. The expansible bag 151 has the merit that it is simple to install within the expansible mandrel. The retraction, or collapse, of the expansible bag is enhanced by the use of quick opening valves in connection with a suitable suction device, such as a partially evacuated vessel.

In the embodiments of FIGS. 10–11, the use of rotary cams to drive the respective plugging sectors 141 outwardly via their shafts 153 is advantageous. That is, the incoming swage 35 can be employed to free a rotary cam such that it can rotate to move the respective shafts 153 and plugging sectors 141 outwardly after the respective pieces are moved substantially completely radially outward. Conversely, the plugging sectors 141 will be withdrawn on the first rotational motion of the shaft 53 in the opposite direction, being retracted much more rapidly than will the pieces 27 which are retracted by the much more slowly moving swage 35.

To ensure that the surface of the belled end 13 are not distorted by sticking, the respective engaging surfaces of the pieces 27, shells 113 and 115 and the like may be treated with suitable material to resist sticking to the plastic of the belled end 13. For example, the respective surfaces may be treated with a fluorocarbon, such as Teflon; or they may be sprayed periodically with a silicon, lubricant or similar material.

As described hereinbefore, the belled end 13 is cooled to a temperature below its softening temperature before the mandrel 25 is withdrawn. To assist in effecting this cooling, a cooling fluid; such as, chilled air, oil, water, or the like; may be circulated through passageways in the mandrel 25 or in the tubular shells 113 and 115 of the receiving mold 43. If the mandrel 25 is serving as a pressure-containing cap, such as described in my hereinbefore referenced copending application Ser. No. 127,931, the fluid circulation passageway may be the same as or in addition to any pressurizing passageways passing therethrough. On the other hand, the pressurized fluid for maintaining a differential pressure during bending, in accordance with Ser. No. 127,931, may be supplied via a pressure cap at the other end of the segment of conduit to be formed into an elbow.

The use of a swage 35 with the protrusion and groove 103 and 105 has been described hereinbefore for the means for effecting expansion and retraction of the plurality of pieces 27 for forming the belled end. Any other suitable means can be employed for effecting the radially outward expansion and inward contraction as long as the means can perform within the limitations described hereinbefore. For example, a radially outwardly expansible bag or cylinder and piston arrangement can be employed. On the other hand, suitable camming surface may be employed to effect radially outward expansion of the pieces 27; with suitable retracting protrusions and grooves, similar to protrusion 103 and groove 105, for effecting retraction.

From the foregoing, it can be seen that this invention provides apparatus for effecting a belled end on a thermoplastic conduit or the like that obviates the disadvantages of the prior art. The term "conduit" is used herein to include the various connections and fittings used therewith, whether formed from the conduit, per se, or separately fabricated by any conventional means, such as by injection molding, rotational molding, casting, and thermoforming. More specifically, the apparatus of this invention, in its embodiments, enables providing a grooved belled end for emplacing a seal for sealingly receiving a second end of another section of thermoplastic conduit or the like therewithin; and, through its expansible mandrel, allows semi-automated, or fully automated production of the belled ends, regardless of the size of the conduit. Thus, the larger sizes in which a seal means becomes desirable may be automated so as to become more economical.

Although this invention has been described with a certain degree of particularity, it is understood that the present disclosure is made only by way of example and that numerous changes in the details of construction and the combination and arrangement of parts may be resorted to without departing from the spirit and the scope of this invention.

I claim:

1. In apparatus for at least semi-automatically belling a first end of thermoplastic conduit for conformingly receiving a second end of conduit, including:
   a. heating means for at least locally heating said first end of said conduit;
   b. support means for supporting said conduit; and
   c. insert means for inserting an insertable mandrel for expanding said end to thereby bell said end to have a predetermined set of internal dimensions for receiving therewithin said second end of conduit having a predetermined set of external dimensions that conformingly mate with said internal dimensions:

The improvement comprising said mandrel being an expandable insertable mandrel having a ridge protruding about its periphery for defining a groove having any predetermined cross sectional shape on the interior of said first end for receiving a seal means intermediate said first end and said second end; said expandable insertable mandrel being connected with said insert means for insertion within said first end of said conduit without requiring elastic response of softened walls of said first end of said conduit in contracting around said ridge; said mandrel being expansible after insertion within said first end of said conduit for belling said first end, and collapsible after said belling and before withdrawal from said first end; said mandrel being connected with said insert means also for withdrawal from said first end of said conduit; said expandable mandrel comprising:

d. a plurality of at least three elongate pieces having a predetermined peripheral radius of curvature that is the same as said second end of said conduit; said plurality of pieces of said expandable mandrel having respective portions of a ridge extending peripherally thereabout for forming said groove in the belled first end for receiving a seal means for sealing against said second end that is subsequently inserted thereinto; said pieces having a radius in a retracted position during insertion and withdrawal less than the radius of said first end of said conduit before belling, and being expansible after insertion within said first end to a radius in a fully expanded and belling position that is greater than said radius of said first end for belling said first end and forming a sealing groove therewithin; said pieces having a normal discontinuity when expanded into their fully expanded position;

e. mounting means holding said plurality of pieces assembled in said retracted position and adapted for allowing radially outward expansion thereof into said belling position after insertion within said first end of said conduit;

f. a central bore having a first frustoconically shaped bore opposite said mounting means for receiving a swage means;

g. a central shaft disposed in said central bore and extending out of said first frusto-conically shaped bore;

h. swage means disposed on said central shaft and movable longitudinally thereof for expanding said plurality of pieces radially outwardly into said belling position; said swage means having a frustoconical shape adapted to conformingly fit said first frusto-conically shaped bore when fully seated thereinto for forming the belled first end;

i. forcing means for forcing relative movement between said swage means and said pieces after insertion within said first end of said conduit to fully seat said swage means in and withdraw said swage means from said first frusto-conically shaped bore for collapsing said mandrel before withdrawal; said forcing means being connected with said swage means and said mounting means;

j. smoothing means for smoothing out the interior surface of the final belled end and removing irregularities caused by said normal discontinuities of the expansibly mounted pieces when they are expanded outwardly into their fully expanded position by the fully seated swage means; and k. retraction means for effecting retraction of said pieces radially inwardly as said swage means is withdrawn from its fully seated position;

such that said mandrel can be expanded to define a bell and a groove of any cross sectional shape, even square, since said conduit does not have to be slipped over said expansible mandrel when fully expanded.

2. The apparatus of claim 1 wherein a receiving mold is provided; said receiving mold comprising a pair of tubular shells that conformingly fit together laterally to define an internal cavity of the desired shape and dimension; and wherein a means is provided for moving said pair of tubular shells laterally together for receiving a belled end and moving them apart to free said belled end.

3. The apparatus of claim 1 wherein said mounting means comprises a pivotal mounting for each of said pieces and said pieces pivot outwardly to accurately define said belled end in their fully expanded position; and said retraction means comprises interconnecting means between said swage means and said pieces such that said pieces are moved into their retracted position with withdrawal of said swage means from said first frusto-conically shaped bore for collapsing said mandrel before withdrawal.

4. The apparatus of claim 1 wherein said mounting means comprises respective track means and riders movable longitudinally thereof and said pieces move longitudinally of said track means radially outwardly into their fully expanded position.

5. The apparatus of claim 1 wherein said mounting means comprises respective parallelogram linkages such that said pieces retain their same relative orientation parallel to their central longitudinal axis as they are moved radially inwardly and outwardly.

6. The apparatus of claim 1 wherein said smoothing means comprises means for rotating said mandrel through a predetermined number of degrees.

7. The apparatus of claim 1 wherein said smoothing means comprises the same plurality of plugging sectors that are movable outwardly into the respective gaps between said plurality of pieces when said pieces are expanded radially outwardly into their fully expanded position by the fully seated swage means; said plugging sectors being retractable inwardly into recesses before said pieces are retracted radially inwardly to their retracted position; and expansion and retraction means for expanding and retracting said plugging sectors.

8. The apparatus of claim 1 wherein said retraction means comprises an interconnection means between said swage means and said pieces such that said pieces are retracted radially inwardly to their retracted position as said swage is withdrawn from said first frusto-conically shaped bore.

* * * * *